(No Model.) 2 Sheets—Sheet 1.
C. P. STEINMETZ.
ALTERNATING CURRENT INDUCTION MOTOR.
No. 602,921. Patented Apr. 26, 1898.
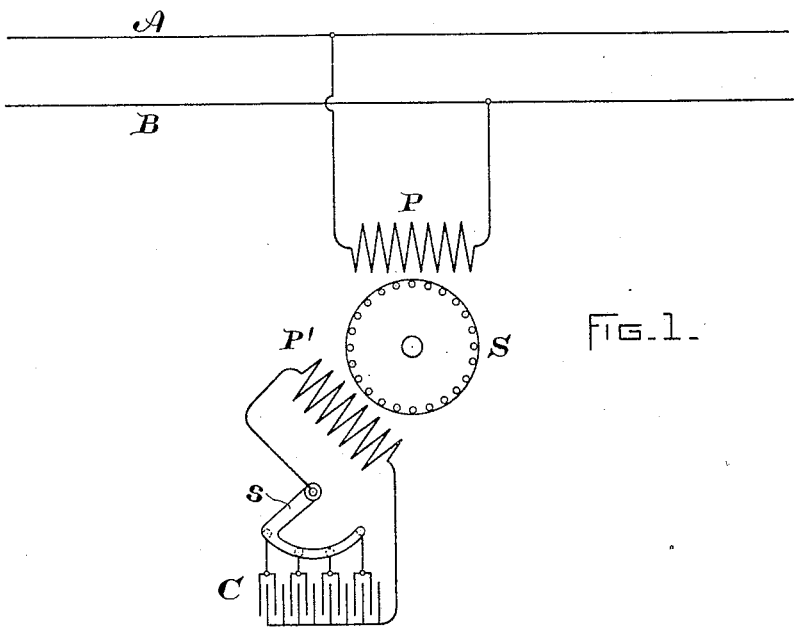
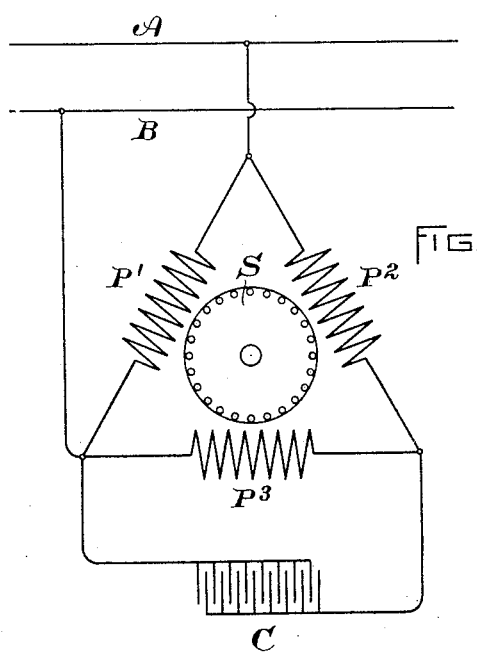
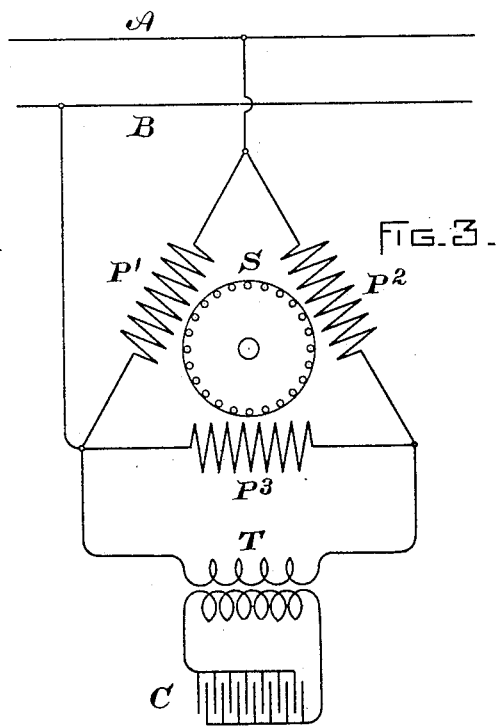
WITNESSES:
A. H. Abell.
B. B. Hull
INVENTOR:
Charles P. Steinmetz
By Geo. R. Blodgett
Atty.

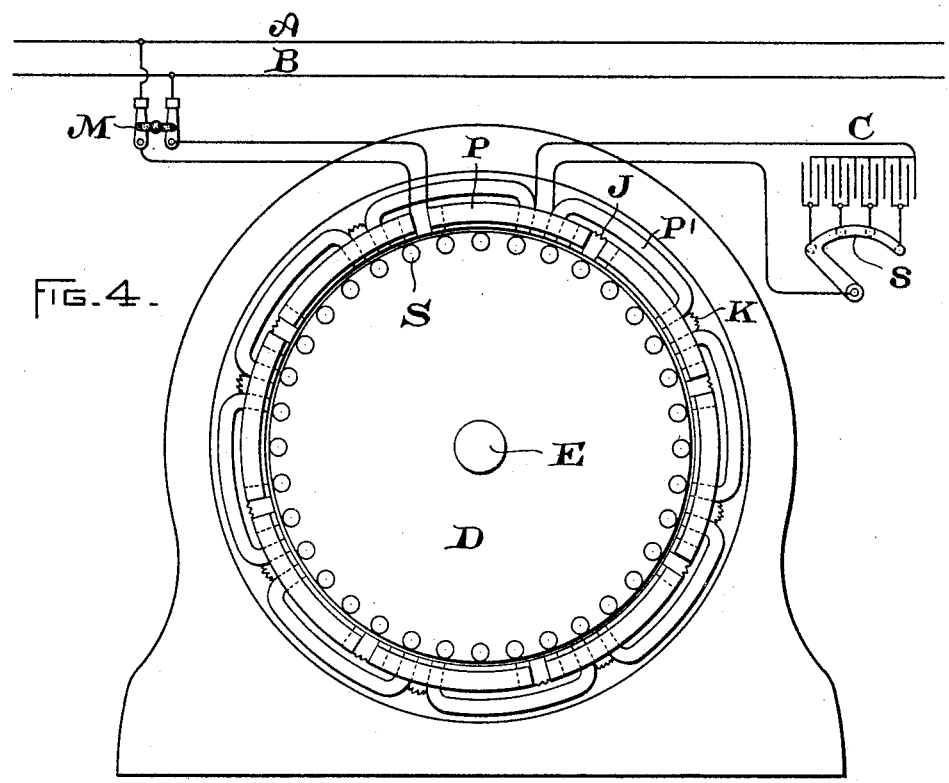

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

ALTERNATING-CURRENT INDUCTION-MOTOR.

SPECIFICATION forming part of Letters Patent No. 602,921, dated April 26, 1898.

Application filed February 12, 1897. Serial No. 623,038. (No model.)

*To all whom it may concern:*

Be it known that I, CHARLES P. STEINMETZ, a citizen of the United States, residing at Schenectady, county of Schenectady, State of New York, have invented certain new and useful Improvements in Alternating-Current Induction-Motors, (Case No. 533,) of which the following is a specification.

In another application for Letters Patent of even date herewith, Serial No. 623,037, I have shown how the operation of an alternating-current induction-motor can be improved by providing a tertiary circuit on the primary member in inductive relation to the primary and secondary circuits or to the secondary circuit alone and by advancing the phase of the currents in the tertiary circuit. I there pointed out that when the only object is to compensate for the self-induction and lagging or magnetizing current in the motor it is preferable to arrange the tertiary circuit at such an angle with the primary circuit that it receives induction only through the secondary of the motor, a result which is accomplished when the tertiary is arranged at an angular distance of one-fourth of the polar pitch from the primary circuit. By the expression "one-fourth of the polar pitch" I mean one-fourth of the angular distance from one north pole to the next north pole in the same phase—for example, in a two-pole motor or a motor having one resultant polar line the polar pitch is three hundred and sixty degrees.

I also pointed out in the above-mentioned application that when the tertiary circuit has to lend starting torque to a single-phase motor it should be so disposed upon the machine as to receive induction directly from the primary as well as from the secondary. This arrangement is necessary in order that dephased current may be induced in the tertiary as soon as the main switch of the motor is closed to produce a rotary field and to lend starting torque to the machine. In order to accomplish this result, it is only necessary to arrange the primary and tertiary windings upon the core at an angular distance other than one-fourth of the polar pitch. It is, however, obvious that these two windings should not be so superposed one upon the other that no rotary field will be produced.

In my former application above mentioned I made generic claims covering both of the forms described, and I also made certain other claims more specifically directed to that form in which the primary and tertiary circuits are in inductive relation only through the secondary, while in this present application I propose to claim that modification or embodiment of the more generic invention which comprises a tertiary circuit in which alternating currents are maintained and which is in inductive relation both to the primary and secondary circuits of the motor, so as to secure starting torque, as well as to compensate for the self-induction and lagging current of the machine.

In my present application I also include certain claims directed to methods of operating motors related to the method claims in my above-mentioned application in accordance with the line of division above set forth and various more specific details to be hereinafter more particularly pointed out and claimed.

In the drawings annexed to this specification, Figures 1, 2, and 3 are simple diagrams showing various forms in which the invention may be embodied, and Fig. 4 is a general view of a motor constructed in accordance with the diagram shown in Fig. 1.

In Fig. 1 the mains of a single-phase alternating circuit or one branch of a multiphase circuit or any other connection to a source of single-phase electromotive force are shown at A B, while P is the primary winding or circuit of an alternating-current induction-motor connected across the mains A B in the ordinary way. P' is the tertiary circuit, preferably wound upon the same iron structure as that upon which the primary P is wound, as will be illustrated in Fig. 4, and in such relation with the primary circuit that it may receive induction therefrom directly as well as from the secondary. The exact angular distance between these two windings may be one-third of the polar pitch, as shown; but this is not absolutely necessary as long as the conditions above set forth are maintained. The tertiary circuit is closed on the phase-advancing device C, preferably a condenser, and this condenser is preferably so arranged that its capacity can be varied by means of a switch S, as will be understood from the diagram, since the amount of capacity required for the production of a rotary field at starting is in general different from that required for neutralizing the lagging current during the normal operation of the machine.

The secondary member S is shown wound with a closed winding, as is usual in induction-motors. I have shown this closed winding of a multiphase squirrel-cage type, and I greatly prefer to use the multiphase winding for the reason that with such winding the main component of the current induced by the primary in the secondary winding has a frequency proportional to the slip and therefore induces in the tertiary P' an electromotive force of a frequency constant and equal to the frequency of the electromotive force impressed upon the mains A B, which makes it possible to run the machine over its normal range of speed when once started without adjusting the condenser. Another advantage arising from the use of a multiphase secondary winding is that it permits current to be induced in the tertiary by the primary through the secondary member, and vice versa. I prefer to use a winding, such as that shown in the drawings, such that the coefficient of mutual induction between the secondary winding and either of the other windings will be substantially constant at any position of the secondary.

The operation of the invention is as follows: With the motor at rest current will be induced in the tertiary circuit from the primary circuit, and this current will be dephased by the transformer action and by the condenser, so that the primary and tertiary circuits together will produce a rotary or shifting field in the secondary, which will create a good starting torque. When the motor has attained a sufficient speed, the condenser may be cut out of circuit, though ordinarily I prefer to so adjust the condenser when a speed approaching that of synchronism is attained that the leading current created thereby in the tertiary will be sufficient to reflect back an advanced wave adapted to neutralize the self-induction of all the windings of the motor, thereby increasing the efficiency, output, and power factor.

In Fig. 2 I show how the invention can be applied to existing types of motors wound for polyphase circuits, but running on a single-phase circuit. Here the mains are represented at A B, as before, connected to two points in the primary winding of a delta-wound induction-motor, as will be understood from the diagram. The primary windings of the motor are lettered P' P² P³. The condenser C is coupled to the winding P³, so that this winding, which is sixty degrees displaced from the winding P', acts as the tertiary circuit.

Fig. 3 shows a construction very similar to Fig. 2, differing only in the addition of a step-up transformer T between the condenser C and the winding P³ of the motor, so as to give higher voltages across the terminals of the condenser than would otherwise be practicable. The secondary members of the motors in Figs. 2 and 3 are shown at S, and the winding is any ordinary closed circuit-winding, though I prefer, as above set forth, to use a multiphase secondary.

Fig. 4 shows a multipolar motor constructed in accordance with the diagram of Fig. 1. A B are the mains, as before. M is the ordinary main switch. P and P' are the primary and tertiary windings. C is the condenser, and s the condenser-switch, while D is the induced member, (shown in this case as the rotor,) mounted on the shaft E and wound with the multiphase secondary winding S.

The primary and tertiary windings consist of coils wound in the usual way on the primary member, but displaced by one-third of the polar pitch and connected together by the wires J and K.

It will be seen that the construction of this machine is similar to that of an ordinary three-phase motor with the omission of one set of inducing-windings.

The construction of motors built in accordance with the diagram of Figs. 2 and 3 may be evidently similar to that of an ordinary three-phase motor and need not be more fully described.

I claim as my invention and desire to secure by Letters Patent—

1. The method of giving starting torque to an alternating-current induction-motor upon a single-phase circuit, which consists in producing and maintaining leading currents in a closed electric circuit in inductive relation to the primary and secondary circuits of the motor, as set forth.

2. The method herein described, which consists in maintaining leading currents in a closed circuit in inductive relation to the primary and secondary circuits of an alternating-current motor running on single-phase circuits to lend starting torque to the motor, and when the motor is at speed compensating for self-induction and magnetizing current by maintaining balancing leading currents in the motor through a source of capacity, as set forth.

3. The method of starting and running an alternating-current motor, which consists in passing alternating current through a primary winding, generating thereby a current in a secondary winding, inducing by the joint action of said primary and secondary windings an electromotive force in a tertiary winding, and causing the current in the tertiary winding to lead the said electromotive force.

4. The method of starting and running an alternating-current motor, which consists in passing alternating current through a primary winding, generating thereby a current in a secondary winding, inducing by the joint action of said primary and secondary windings an electromotive force in a tertiary winding, and causing the current in the tertiary winding to lead the said electromotive force, and reflecting back from the tertiary an advanced wave, to reduce the lagging currents in the machine.

5. The combination of an alternating-current motor for single-phase circuits, having primary and secondary windings, a tertiary circuit in inductive relation to both the primary and secondary windings, and means for causing the current in the tertiary to lead the electromotive force, as set forth.

6. In an alternating-current motor for single-phase circuits, the combination with a primary winding, of a tertiary winding displaced therefrom by an angular distance other than one-fourth of the polar pitch, a secondary winding capable of rotation relatively to said primary winding, and means for causing the current in the tertiary to become leading.

7. In an alternating-current motor for single-phase circuits, the combination with a primary winding, of a secondary winding capable of rotation relatively to said primary winding, and a tertiary winding in inductive relation with the primary winding both directly and through the secondary, and a phase-advancing device so connected as to advance the phase of the current in the tertiary circuit.

8. In an alternating-current motor for single-phase circuits, the combination with a primary winding of a secondary winding capable of rotation relatively to said primary winding, and a tertiary winding in inductive relation with the primary winding both directly and through the secondary, and an adjustable phase-advancing device so connected as to advance the phase of the current in the tertiary circuit.

9. The combination of an induction-motor, having a delta-wound primary member, one branch of which is connected across a single-phase circuit, and a condenser connected across a second branch of the primary winding and in inductive relation to the secondary member, as set forth.

10. The combination in an alternating-current induction-motor for single-phase circuits of a primary winding, a secondary winding, a tertiary winding wound on the primary member and displaced from the primary winding by an angular distance other than one-fourth of the polar pitch, a source of leading currents in the tertiary winding, and means for regulating the value of the leading current in the tertiary circuit.

11. The combination of an alternating-current motor for single-phase circuits, having primary and multiphase secondary windings, a tertiary circuit in inductive relation to both the primary and secondary windings, and means for causing the current in the tertiary to lead the electromotive force, as set forth.

12. The combination in an alternating-current motor of the single-phase type of a primary winding, a relatively-rotatable secondary winding so designed that the coefficient of mutual induction between the secondary winding and either of the other windings is substantially constant at any position of the secondary, and a tertiary in inductive relation with the primary both directly and through the secondary.

13. The combination in an alternating-current motor of the single-phase type of a primary winding, a relatively-rotatable secondary winding so designed that the coefficient of mutual induction between the secondary winding and either of the other windings is substantially constant at any position of the secondary, and a tertiary in inductive relation with the primary both directly and through the secondary, and a phase-advancing device arranged to act upon the tertiary.

14. A single-phase alternating-current motor having its inducing member wound with windings displaced approximately one-third of the polar pitch, one of said windings being connected to a pair of single-phase mains, and one being shunted by a condenser.

In witness whereof I have hereunto set my hand this 28th day of January, 1897.

CHARLES P. STEINMETZ.

Witnesses:
B. B. HULL,
M. H. EMERSON.